United States Patent [19]

Goe et al.

[11] Patent Number: 4,839,323

[45] Date of Patent: Jun. 13, 1989

[54] INSOLUBLE COMPLEX OXIDATION CATALYSTS

[75] Inventors: Gerald L. Goe; Thomas D. Bailey, both of Greenwood; James R. Beadle, Plainfield, all of Ind.

[73] Assignee: Reilly Tar & Chemical Corporation, Indianapolis, Ind.

[21] Appl. No.: 115,962

[22] Filed: Nov. 2, 1987

Related U.S. Application Data

[62] Division of Ser. No. 934,014, Nov. 24, 1986.

[51] Int. Cl.[4] .................... B01J 31/00; C07C 45/00
[52] U.S. Cl. ........................ 502/159; 502/170; 568/320; 568/321; 568/328; 568/335
[58] Field of Search ............... 502/159, 170; 568/320, 568/321, 328, 335

[56] References Cited

U.S. PATENT DOCUMENTS

| | | | |
|---|---|---|---|
| 3,636,159 | 1/1972 | Solomon | 502/159 |
| 3,966,821 | 6/1976 | Kudo et al. | 568/321 |
| 4,175,098 | 11/1979 | Mizukami et al. | 568/321 |
| 4,211,880 | 7/1980 | Haag et al. | 502/159 |
| 4,473,711 | 9/1984 | Coon | 568/321 |
| 4,526,884 | 7/1985 | Tsou et al. | 502/159 |
| 4,603,221 | 7/1986 | Shin | 568/309 |

FOREIGN PATENT DOCUMENTS

76101964 9/1976 Japan .

OTHER PUBLICATIONS

Mizukami et al., *Bull. Chem. Soc. Jpn.* 1979, 52,2689.
Yoda Research and Development Co. Ltd., "Catalytic oxidation of Tetralin", (Israeli Patent No. 41,114,1975), CA 84:89889b 1976.
Seleznev et al., "I-Tetralone", (USSR 565,910, 1977), CA 87:167803x 1977.
Kudo et al., "α-Tetralone," (Japan Kokai 75.058.044, 1975), CA 83:114075x 1975.
A. J. Moffat, *Journal of Catalysis,* 18, 193(1970).

*Primary Examiner*—William R. Dixon, Jr.
*Assistant Examiner*—David M. Brunsman
*Attorney, Agent, or Firm*—Woodard, Emhardt, Naughton, Moriarty & McNett

[57] ABSTRACT

Insoluble complex oxidation catalysts comprising chromium salts bound on an insoluble polymer supports having pendant pyridine groups, that are useful in oxidation reactions such as Tetralin ® to α-tetralone, ethylbenzene to acetophenone, and 2-methyl-5-ethylpyridine to 2-methyl-5-acetylpyridine. Also disclosed are processes for accomplishing such oxidations utilizing such catalysts.

6 Claims, No Drawings

INSOLUBLE COMPLEX OXIDATION CATALYSTS

This application is a division of application Ser. No. 934,014, filed Nov. 24, 1986.

BACKGROUND OF THE INVENTION

This invention relates to the field of insoluble oxidation catalysts, and more specifically to novel complexes of chromium metal catalysts supported on an insoluble polymer having pendant pyridine groups. These complexes have shown themselves to be useful in catalyzing various oxidation reactions as described more fully below.

Considering one such reaction for the moment, it involves the oxidation 1,2,3,4-tetrahydronaphthalene (available commercially under the trademark Tetralin ® by Du Pont de Nemours, E.I. & Co.) to 3,4-dihydro-1(2H)naphthalenone, which is commonly referred to as 'α-tetralone.' About 35,000 tons of α-tetralone are produced in the United States each year for use as an intermediary in the manufacture of methyl-1-naphthylcarbamate, an insecticide generically referred to as carbaryl and commercially available under the trademark Sevin ®, as well as in the manufacture of other agricultural chemicals and drugs. Typically, α-tetralone has been prepared by the liquid phase autoxidation of Tetralin ® in the presence of a homogeneous oxidation catalyst, and possibly also a homogeneous catalyst modifier in an attempt to improve reaction selectivity to α-tetralone. The oxidation product mix normally obtained in such reactions includes α-tetralone, 1,2,3,4-tetrahydro-1-naphthol, which is commonly referred to as 'α-tetralol,' and α-Tetralin ® hydroperoxide.

A fundamental problem with these homogeneous oxidation catalyst processes has been the relative difficulty in isolating the desired α-tetralone or other product from the reaction mix, regardless of selectivity. Not only must the undesired reaction by-products be separated from the desired product, but the homogeneous oxidation catalyst and homogeneous catalyst modifiers of the prior art must also be separated out and recovered for subsequent reuse. As a result, the isolation of desired product, such as α-tetralone, has historically required additional time-consuming distillation and other processing procedures, thereby increasing production and other costs.

Such problems exist with the Tetralin ® oxidation catalyst and catalyst modifier disclosed in U.S. Pat. No. 3,404,185 issued to Thomas, et al. Thomas discloses a homogeneous Cr(III) acetate oxidation catalyst that is used in the presence of a homogeneous heterocyclic aromatic amine catalyst modifier, 5-ethyl-2-methylpyridine which is commonly referred to as MEP. The reaction product reportedly obtained is a mixture of α-tetralone and α-tetralol in approximately a 20:1 ratio, and α-Tetraline ® hydroperoxide. As reported in Thomas, et al., the presence of MEP as a catalyst modifier apparently improved the selectivity of the oxidation reaction to α-tetralone due to the presence of pyridine ligands in the MEP. However, for efficient and effective operation, the catalyst and catalyst modifier must be separated from the homogeneous product mix through a series of steps as reported in Thomas, et al. And even then, full recovery and regeneration of the catalyst and modifier for reuse are in doubt.

Many other examples exist in the art of homogeneous oxidation catalyst and modifiers which have been used in the synthesis of α-tetralone, with varying degrees of success. Some of these include the following: U.S. Pat. No. 3,404,185 (Cr(III) acetate +MEP); Mizukami et al., Bull. Chem. Soc. Jpn. 1979, 52, 2689 (Cr(III) acetate +DMF); Israeli 41,114 (Cr oxide +2,4.6-trimethylpyridine); USSR 565,910 (1975) (Co(II) salts +polyurethane); Japan Kokai 76.101.964 (Cr(III) naphthenate +piperidine); Ger. Offen. DE 2,508,334 (Cr(III) naphthenate +2,4-lutidine); Japan Kokai 75.558.044 (aqueous $CrO_3$ +lutidines); and U.S. Pat. No. 4,473,711 (chromium(III)-exchanged Dowex CCR-2 +MEP).

It has also been reported in U.S. Pat. No. 4,473,711 issued to Coon that α-tetralone has been prepared by the liquid phase autoxidation of Tetralin ® in the presence of a Cr(III)-exchanged carboxylic acid resin such as Dowex ® CCR-2 which is commercially available from Dow Chemical U.S.A. Dowex ® CCR-2 is reported to be a weak acid cation exchanger containing carboxylic acid groups within an acrylic-divinylbenzene matrix. However, Coon used this heterogeneous catalyst in the presence of the same MEP modifier found in toally homogeneous systems such as those listed above.

As reported in Coon, the insoluble Cr(III)-exchanged carboxylic acid resin catalyst offered several advantages over comparable homogeneous catalysts. These advantages included lower residue formation, filtration of the insoluble catalyst from the homogeneous product mix, easier recycling of the catalyst in bead form, and the capability of continuous processing. However, the same fundamental problem present in Thomas, et al. and the other art also exists with the catalyst and modifier system reported in Coon. To completely isolate the combined reaction catalyst and modifier from the homogeneous product mix and to then go forward to recover the α-tetralone product, a multi-step separation process must take place still involving difficult and costly distillation procedures to remove the homogeneous MEP modifier.

Moreover, additional problems are evident with the catalyst disclosed in Coon. It is known that the Dowex ® CCR-2 carboxylic acid resin, for example, can be damaged by prolonged contact with strong oxidizing agents, and that its maximum suggested operating temperature is only 120° C. These are both significant limitations effectively reducing its commercial utility.

The Applicants' novel insoluble catalyst compositions and processes for utilizing the same, as disclosed herein, solve these fundamental problems found in prior art whole- or part-homogeneous catalyst systems both in Tetralin ® or other oxidation reactions. The Applicants' catalysts provide considerable advantages over the two-part catalysts and modifier combinations such as disclosed in Thomas et al. and Coon. In the applicants' catalyst, pyridine ligands to improve reaction selectivity and an effective chromium salt are both directly bound to and supported by a single insoluble polymer structure, thereby creating a one-part totally insoluble catalyst system. The need for a separate homogeneous modifier, such as the MEP used in Thomas et al. and Coon, and the attendent additional processing and recovery steps are therefore eliminated.

With Applicant's catalysts, there is instead simply a single standard filtration or similar separation step required, such as decantation or the like, to remove the insoluble supported catalysts from the otherwise homogeneous product mix. Ease of separation and recovery and lower processing costs, along with greater recycling efficiencies, are thus realized over prior art catalyst systems. The Applicants' preferred insoluble supported catalysts are also strongly resistant to oxidation degradation and demonstrate a far broader range of operable temperatures to at least about 225° C., which are significant factors demonstrating their commercial practicality. Additional unexpected benefits have been lower residue produced in the product mix and, for example, the absence of any side formation of α-Tetralin ® hydroperoxide in the Tetralin ® oxidation.

SUMMARY OF THE INVENTION

As one embodiment of the Applicants' invention, a new insoluble complex oxidation catalyst comprising a chromium salt supported on an insoluble polymer having pendant pyridine groups has been synthesized that is useful in oxidation reactions such as that of Tetralin ® to α-tetralone. The preferred catalyst compositions prepared to date within this class are 2 weight percent (%) Cr(II) or (III) supported directly on cross-linked copolymers principally composed of 2- and 4-vinylpyridines.

As other embodiments of the Applicants' invention, processes are disclosed for the preparation of these insoluble supported catalyst complexes as well as for their use in several oxidations in both batch and continuous reaction modes. These include the oxidations of: Tetralin ® to α-tetralone; 2-methyl-5-ethylpyridine (MEP) to 2-methyl-5-acetylpyridine (MAP); and ethylbenzene to acetophenone.

Related objects and advantages of the present invention to those already stated above will be apparent from the following description.

DESCRIPTION OF THE PREFERRED EMBODIMENT

One aspect of the present invention comprises a new oxidation catalyst formed by the complex of an insoluble polymer having available pendant pyridine groups with a chromium salt. More specifically, the Applicants' have discovered novel complexes of insoluble 2- and 4-vinylpyridine polymers supporting chromium salts that usefully perform as one-part, totally insoluble oxidation catalysts in various oxidation reactions.

The most preferred inorganic oxidation components for complexing in the Applicants' catalysts have to date been the chromium salts Cr(III) acetate and Cr(II) acetate. However, other metal salts may also be utilized and are understood as contemplated and within the scope of the Applicants' invention as disclosed and claimed herein. Examples of these include Cr(III) nitrate, Cr(III) acetylacetone, Cr(II) oxide, and chromic oxide.

The most preferred insoluble polymer supports for use in the Applicants' catalysts have to date been insoluble cross-linked poly(2- and 4- vinylpyridine) copolymers, such as those commercially available under the Reillex ™ family of trademarks from Reilly Tar & Chemical Corporation of Indianapolis, Indiana. In these Reillex ™ copolymers, substantial pyridine ligands are attached directly at their 2- or 4- positions to the copolymer's vinyl backbones which are in turn cross-linked with some percentage of divinylbenzene being present. Reillex ™ 225, for example, has been determined to be the most preferred polymer support to date, being a 25% cross-linked copolymer of 2- vinylpyridine and a commercially available divinylbenzene and exhibiting a convenient insoluble bead form, high porosity, good thermal stability, high concentration of metal binding sites, and resistance to strong oxidizing agents. Although bead size and other physical characteristics of these polymeric supports have not been shown to be critical, it is noted that Reillex ™ 225 is typically available in bead sizes of approximately 18-20 mesh. It is also noteworthy that the temperature stability for extended use of the Reillex ™ 225 copolymer is about 260° C., which comfortably exceeds the requirements for most, if not all, oxidations usefully catalyzed by metal complexes of this type. It therefore has commercial practicability unlike, for example, the carboxylic acid resin disclosed in the Coon patent discussed above.

Other insoluble polymers containing effective amounts of pyridine groups and exhibiting these same or similar desirable properties are also useful in the Applicants' invention, and are understood as contemplated and within the scope thereof. These include, for example, other preferred cross-linked poly(4- vinylpyridine) copolymers such as those commercially available under the Reillex ™ 425 and 402 trademarks also by Reilly Tar & Chemical Corporation. Of these, Reillex ™ 425 is a 25% cross-linked copolymer of 4- vinylpyridine and a commercially available divinylbenzene. In other relevant respects, Reillex ™ 425 is similar in its performance to the Reillex ™ 225 described above. Reillex ™ 402 is a cross-linked copolymer of 4- vinylpyridine and a commercially available divinylbenzene. Reillex ™ 402 is a granular powder, in contrast to the bead forms of Reillex ™ 225 and 425, with a particle size of about 60 mesh and a slightly lower, but still acceptable, maximum temperature for extended use of about 225° C. For more detail as to the chemical make-up and characteristics of these or other Reillex ™ polymers, reference can be made to relevant literature available, either through the industry or from the manufacturer itself, One such reference is a brochure published by the Reilley Tar & Chemical Corporation entitled Reillex ™ : A New Family of Crosslinked Polyvinylpyridines from Reilly (Reillex ™ Report 2, 1986), which is hereby incorporated by reference in all respects relevant and material to the application at hand.

In addition to these several Reillex ™ polymers, other polymers are also suitable for use in the Applicants' preferred catalysts as described herein. These include polymers that may be or have been commercially marketed, as well as others that can be readily prepared by known procedures such as those, for example, described in Examples 51 and 53 below. In this regard, only two limitations are not understood to apply to such suitable polymers. The first is that they are insoluble in the reaction mix, whether this insolubility results from molecular weight, cross-linking by chemical or radiation means, or some other technique or procedure. The second is that they contain at least some effective amount of pendant pyridine groups sufficient to support and complex with the chromium salt in order to provide the beneficial catalytic activity achieved to a great extent by Applicants' preferred catalysts described above. Additional pyridine functionality may further provide desired selectivity in the oxidation products of a particular reaction under consideration.

As to what constitutes such an effective or sufficient amount of pendant pyridine groups, this will vary, of course, depending upon many factors including the particular polymer and reaction involved. The equipment used in also a factor as lesser amounts of pyridine functionality may be acceptable where larger quantities of catalyst are used or where contact times, flow rates or other reaction conditions are adjusted to account for the lower levels of complexed chromium on the polymer. Experiments to date have suggested that polymers with pyridyl contents as low as 10% by weight are still effective and provide acceptable catalytic activity, as shown in Examples 53 and 54 below. More preferred have been pyridine levels of at least about 20–25% because of the additional reactive sites they provide, and most preferred have been pyridine amounts in excess of about 50% as exhibited in the Applicants' most preferred Reillex TM polymers.

Once selected, the Applicants' preferred oxidation catalysts are then prepared from the chromium and polymer components by standard and known procedures for such reactions. For example, preferred to date has been simply combining weighted portions of the selected chromium salt and the desired insoluble vinylpyridine polymer in a solvent such as methanol. The resulting slurry is heated to reflux and mixed for approximately one hour before the solvent is removed under vacuum. The result is an insoluble complex of the chromium salt bound to the polymer support. No specific reaction conditions or amounts of reactants have been shown to be critical in forming these effective complexes. For example, the loading of chromium in the complex has not proven critical, and several prepared catalysts have yielded good conversions and selectivities in Applicants' preliminary experiments to date. These have included insoluble complexes prepared to date up to about 10% by weight Cr(II) or (III) loaded on each of the poly(2- and 4- vinylpyridine) cross-linked copolymers identified above by their commercial trademarks Reillex TM 225, 425 and 402. Chromium loading at a level of about 2% by weight has been preferred thus far, but this is in no way believed limiting of the scope or breadth of the Applicants' invention on this point. References to the specific examples below will give further explanation of this work.

Another aspect of the Applicants' invention comprises novel batch and continuous processes for the oxidation of appropriate substrates using the Applicants' preferred catalysts described above. These processes are highlighted by simply combining amounts of the oxidation precursor and the preferred catalyst in a reaction vessel, which is preferrably sealed, and with the introduction of an oxygen-containing gas. Causing the resultant mixture to be at a temperature sufficient to initiate the oxidation reaction is then all that is required to achieve beneficial effects from the Applicants' invention as described and claimed herein. Neither the specific equipment used or conditions experienced have been shown to be essential or critical from experiments thus far performed. For example, once initiated, most oxidation reactions of this type are exothermic, thereby requiring little if any additional energy input to continue the reaction except for the continuing presence of an oxygen source. In fact specific yields and ratios of reaction products may depend in various reactions upon maintaining the reaction temperature at or within a certain range to optimize results. These conditions are, of course, highly dependent upon the specific oxidation reaction under consideration.

Regardless of these peculiarities, the preferred processes of the Applicants' invention are uniformly benefited and highlighted by the absence of any homogeneous catalyst or catalyst modifier which complicate the isolation of the desired $\alpha$-tetralone or other product or the separation and recovery of the catalyst itself for subsequent reuse. Furthermore, the resistance to oxidation of the Applicants' preferred insoluble polymer supports and their strong affinity for the preferred chromium salt compounds render these catalysts well-suited for continuous process oxidations without the need for regeneration or addition of more catalyst and without the loss of chromium ions often experienced in the prior art.

For the purposes of further promoting a better understanding of the catalysts and processes of the present invention, reference will now be made in the examples below to specific instances of their preparation and use. As stated above, no critical set of reaction conditions is involved or known to exist, but the examples that follow do set forth specific preferred conditions that Applicants have used to date which have tended to maximize the oxidation conversions and selectivities of the tests conducted. Generally, although gentle oxidation conditions are preferred, temperature stability is important, with ranges between 120° and 140° C. being most preferred at this time. The examples that follow are exemplary only, and no limitation of the scope or breadth of the Applicants' catalyst invention or of its uses in various oxidation reactions is thereby intended.

EXAMPLE 1

Oxidation of Tetralin ®

The preferred catalyst 2% Cr(III) acetate/poly-(4-vinylpyridine) copolymer was prepared by charging 1 gram of Cr(III) acetate/$H_2O$, 50 grams of poly(4- vinylpyridine) copolymer in the form of Reillex TM 425, and 100 mL of methanol to a 300 mL round-bottomed flask, which was then placed upon a rotary evaporator, and mixed and heated in a 70° C. water bath. After 1 hour, vacuum was applied to the unit, removing the solvent and leaving the insoluble polymer catalyst as dry pale violet beads. A batch oxidation of Tetralin ® using the 2% Cr(III) acetate/poly(4- vinylpyridine) copolymer catalyst was then accomplished in a 4-necked, 500 mL Morton-type round-bottomed flask equipped with a gas dispersion tube, mechanical stirrer, thermometer and a gas outlet. A regulated $O_2$ cylinder was attached to the gas delivery tube and a rotameter was attached to the outlet. The flask was charged with 288.8 grams Tetralin ® and 10 grams of the catalyst beads. Then $O_2$ flow was started along with stirring and heating. At about 100° C., $O_2$ uptake was noted by a decrease in flow rate at the outlet. The temperature was maintained at 120° C. about one/half hour then the $O_2$ flow was stopped and the reaction was allowed to cool. The cooled mixture was vacuum filled and the catalyst washed for recycling with cyclohexane. The filtrate was distilled using known procedures, yielding 260.9 grams Tetralin ® (68°–80° C./1 mmHg) for a Tetralin ® conversion of 10%, and 18.2 grams of the desired $\alpha$-tetralone/$\alpha$-tetralol product mixture (98–120° C./1 mmHg) at a ratio of 20.8 and having the known uses as described briefly in the Background section of this application.

EXAMPLE 2

Oxidation of Tetralin ®

The most preferred catalyst of 2% Cr(III) acetate/-poly-(2- vinylpyridine) copolymer was prepared in similar fashion to that described in Example 1 using Reillex ™ 225 copolymer. A batch oxidation of Tetralin ® using the resulting insoluble copolymer catalyst was accomplished using the same protocol as in Example 1. Yield was 269.0 grams Tetralin ® (68–80° C./1 mmHg) for a Tetralin ® conversion of 7%, and 12.0 grams of the α-tetralone/α-tetralol mixture (98–120° C./1 mmHg) at a ratio of 24.2.

EXAMPLES 3–17

Oxidation of Tetralin ®

A series of batch Tetralin ® oxidations were performed utilizing catalysts of the present invention in a stirred, one liter autoclave (such as the autoclave sold under the trademark Magne Drive by Autoclave Engineers, Inc.) using compressed air as the source of oxygen. The reactor was set up with provision for adjustment and monitoring of pressure, temperature and gas flow rate. A Taylor $O_2$ analyzer was used to determine the percentage of $O_2$ in the vent gas. Generally, after Tetralin ® and the chromium/poly(vinylpyridine) catalyst was charged to the unit, stirring was started, the reactor was heated to the desired temperature, and then air flow was started. After completion of the reaction the cooled mixture was filtered to remove the insoluble catalyst and the percentage of Tetralin ®, α-tetralol, α-tetralone, and α-Tetralin ® hydroperoxide was determined by gas-liquid chromatography (GLC).

The chromium/poly(vinylpyridine) catalyst utilized in these examples were prepared by combining weighted portions of the desired chromium compound and dry insoluble poly(vinylpyridine) support in a methanol solvent. The resulting slurry was then heated to reflux and mixed for approximately 1 hour before the solvent was removed under vacuum.

Table I below sets forth the results obtained. In Example 5, insoluble 2% Cr(II) acetate/poly(4- vinylpyridine) [Reillex ™ 425] catalyst yielded a 14.0:1 α-tetralone/α-tetralol ratio at a 12.3% conversion rate. The catalyst was recycled after acetone rinse and drying three times in Examples 12, 13, and 14, and selectivity (ratio of α-tetralone/α-tetralol) fell only slightly while the conversion increased slightly. In view of the sensitivity of these reactions to many factors including the maintenance of desired conditions such as temperature, particularly during the exothermic phase of the oxidations, it is difficult to draw absolute conclusions from the limited testing the Applicants' have performed to date. However, on a comparative basis, the Examples reflected in Table I suggest that higher air pressure may increase conversion while not necessarily selectivity in the case of the 2% Cr(II) acetate/poly(4- vinylpyridine) [Reillex ™ 425] catalyst (Examples 5 and 7), and that appreciably higher chromium loading of the polymer support may actually result in lower selectivity in some instances (Examples 5 and 10). Chromium salts other than chromium acetate were also shown in limited testing to complex effectively with the Applicants' preferred insoluble polymer supports to catalyze the Tetraline ® oxidation reaction (Examples 3, 4, 6, 8, and 9). As no effort was made to optimize conversions or product ratios in this work, little quantitative information can again be taken from Table I in this regard, except that excellent selectivity can be achieved (Example 9) and that simple recovery and recycle of the catalysts are possible (Examples 15, 16 and 17).

TABLE I

TETRALIN ® OXIDATION

| Example | 3 | 4 | 5 | 6 | 7 | 8 | 9 | 10 |
|---|---|---|---|---|---|---|---|---|
| Tetralin ® (g) | 396.6 | 396.6 | 396.6 | 396.6 | 396.6 | 396.6 | 396.6 | 396.6 |
| Catalyst (g) | Reillex ™ 425 + $H_2Cr_2O_7$ (1.3) [wet] | Reillex ™ 425 + $H_2Cr_2O_7$ (1.3) [dry] | 2% Cr(II) acetate on Reillex ™ 425 (10.0) | 2% Cr(III) acetylacetonate on Reillex ™ 425 (10.0) | 2% Cr(II) acetate on Reillex ™ 425 (10.0) | 2% Cr oxide on Reillex ™ 425 (10.0) | 2% Cr(III) nitrate on Reillex ™ 425 (10.0) | 10% Cr(II) acetate on Reillex ™ 425 (10.0) |
| reaction time (h) | 1.0 | 1.0 | 1.5 | 1.0 | 2.0 | 1.0 | 1.5 | 1.5 |
| temp (°C.) | 120 | 120 | 130 | 120 | 130–140 | 120 | 120 | 130 |
| pressure (psig) | 150 | 150 | 150 | 150 | 400 | 150 | 150 | 150 |
| flow (L/min) | 0.8 | 0.8 | 0.8 | 0.8 | 0.8 | 0.8 | 0.8 | 0.8 |
| GLC analysis: | | | | | | | | |
| % conversion | 16.0 | 24.2 | 12.3 | 15.4 | 7.7 | 16.5 | 10.8 | 17.6 |
| % Tetralin ® | 82.9 | 75.8 | 87.7 | 84.7 | 82.3 | 83.5 | 89.2 | 82.4 |
| % α-tetralol | 5.4 | 6.7 | 0.69 | 3.7 | 1.1 | 5.8 | 0.43 | 2.4 |
| % α-tetralone | 9.0 | 14.6 | 9.7 | 9.4 | 14.7 | 8.4 | 8.5 | 13.0 |
| Ratio: α-tetralone / α-tetralol | 1.7 | 2.2 | 14.0 | 2.5 | 13.0 | 1.4 | 19.8 | 5.4 |

| Example | 11 | 12 | 13 | 14 | 15 | 16 | 17 |
|---|---|---|---|---|---|---|---|
| Tetralin ® (g) | 396.6 | 396.6 | 396.6 | 396.6 | 396.6 | 396.6 | 396.6 |
| Catalyst (g) | 10% Cr(II) acetate on Reillex ™ 425 (10.0) [recycle #10] | 2% Cr(II) acetate on Reillex ™ 425 (10.0) | 2% Cr(II) acetate on Reillex ™ 425 (10.0) [recycle #12] | 2% Cr(II) acetate on Reillex ™ 425 (10.0) [recycle #13] | 2% Cr(III) nitrate on Reillex ™ 425 (10.0) | 2% Cr(III) nitrate on Reillex ™ 425 (10.0) [recycle #15] | 2% Cr(III) nitrate on Reillex ™ 425 (10.0) [recycle #16] |
| reaction time (h) | 1.5 | 1.5 | 1.5 | 1.5 | 1.5 | 1.5 | 1.5 |
| temp (°C.) | 130 | 130 | 140 | 140 | 130 | 130 | 130 |
| pressure (psig) | 150 | 150 | 150 | 150 | 150 | 150 | 150 |
| flow (L/min) | 0.8 | 0.8 | 0.8 | 0.8 | 0.8 | 0.8 | 0.8 |
| GLC analysis: | | | | | | | |
| % conversion | 15.9 | 10.7 | 13.3 | 13.0 | 13.5 | 15.7 | 21.7 |
| % Tetralin ® | 84.1 | 89.3 | 86.7 | 87.0 | 86.5 | 84.3 | 78.3 |
| % α-tetralol | 1.8 | 0.92 | 1.53 | 1.6 | 0.80 | 1.6 | 3.7 |
| % α-tetralone | 12.0 | 8.5 | 10.8 | 10.5 | 11.5 | 12.6 | 16.1 |
| Ratio: | 6.7 | 9.2 | 7.0 | 6.5 | 14.4 | 7.9 | 4.3 |

TABLE I-continued

| | |
|---|---|
| α-tetralone | |
| α-tetralol | |

EXAMPLES 18-33

Oxidation of Tetralin ®

A second series of batch Tetralin ® oxidations similar to those reported in Examples 3-17 were run in a glass reactor utilizing 100% $O_2$ instead of pressurized air. The reactor setup was the same.

Under 1 atmosphere $O_2$, selectivity of 2% Cr(III) nitrate/- and 2% Cr(II) acetate/poly (4- vinylpyridine) [Reillex TM 425] catalysts remained high (Examples 18 and 19). A follow-up comparative test showed that unlike the prior art, the Applicants' preferred catalyst performed equally well with neither conversion nor selectivity being appreciably affected by the presence of a homogeneous MEP modifier (Example 20). In a recycle study of the Applicants' preferred catalyst (Examples 21-23), this catalyst yielded good results with selectivity increasing on the second and third runs while conversion remained essentially constant. Another recycle experiment using a 2% Cr(II) acetate/poly(2-vinylpyridine) [Reillex TM 402] catalyst also demonstrated good selectivity upon initial use (Example 24), but experienced diminished selectivity upon recyle for some unknown reason (Examples 25-27). A 2% Cr(II) acetate/poly(4- vinylpyridine n-oxide) catalyst also gave acceptable results in its first use (Example 32), but conversion dropped appreciably when recycle was attempted (Example 33).

Several reactions were also run in autoclave using pressurized $O_2$. Higher $O_2$ pressure increased both conversion and selectivity in the tests performed (Examples 28 and 29). However, a subsequent recycle series showed increasing conversion but decreasing selectivity, possibly due at least in part to a lapse in maintaining temperature with the desired range during the reaction procedure (Examples 30 and 31).

Table II below sets forth the results obtained.

TABLE II

TETRALIN ® OXIDATION

| Example | 18 | 19 | 20 | 21 | 22 | 23 | 24 | 25 |
|---|---|---|---|---|---|---|---|---|
| Tetralin ® (g) | 291.9 | 291.9 | 291.9 | 291.9 | 291.9 | 291.9 | 291.9 | 291.9 |
| Catalyst (g) | 2% Cr(III) nitrate on Reillex TM 425 (10.0) | 2% Cr(II) acetate on Reillex TM 425 (10.0) | 2% Cr(II) acetate on Reillex TM 425 (10.0) + MEP (2.4) | 2% Cr(II) acetate on Reillex TM 425 (10.0) | 2% Cr(II) acetate on Reillex TM 425 (10.0) [recycle #21] | 2% Cr(II) acetate on Reillex TM 425 (10.0) [recycle #22] | 2% Cr(II) acetate on Reillex TM 402 (10.0) | 2% Cr(II) acetate on Reillex TM 402 (10.0) [recycle #24] |
| reaction time (h) | 1.0 | 1.0 | 1.0 | 1.0 | 2.0 | 2.0 | 0.5 | 0.5 |
| temp (°C.) | 120-130 | 120-130 | 120-130 | 120-130 | 120-130 | 120-130 | 125 | 125 |
| pressure (psig) | 14.7 | 14.7 | 14.7 | 14.7 | 14.7 | 14.7 | 14.7 | 14.7 |
| flow (L/min) | 0.4 | 0.4 | 0.4 | 0.4 | 0.4 | 0.4 | 0.4 | 0.4 |
| GLC analysis: | | | | | | | | |
| % conversion | 8.2 | 7.9 | 6.7 | 6.6 | 6.7 | 6.5 | 7.5 | 7.0 |
| % Tetralin ® | 91.8 | 92.1 | 93.3 | 93.4 | 93.3 | 93.5 | 92.5 | 93.0 |
| % α-tetralol | 0.4 | 0.4 | 0.3 | 0.3 | 0.2 | 0.2 | 0.2 | 0.3 |
| % α-tetralone | 6.4 | 6.0 | 4.49 | 4.72 | 5.05 | 4.79 | 5.76 | 5.1 |
| Ratio: α-tetralone / α-tetralol | 16.0 | 14.6 | 17.3 | 14.7 | 20.2 | 19.6 | 22.6 | 15.5 |

| Example | 26 | 27 | 28 | 29 | 30 | 31 | 32 | 33 |
|---|---|---|---|---|---|---|---|---|
| Tetralin ® (g) | 291.9 | 291.9 | 291.9 | 291.9 | 291.9 | 291.9 | 291.9 | 291.9 |
| Catalyst (g) | 2% Cr(II) acetate on Reillex TM 402 (10.0) [recycle #25] | 2% Cr(II) acetate on Reillex TM 402 (10.0) [recycle #26] | 2% Cr(II) acetate on Reillex TM 402 (10.0) | 1% Cr(II) acetate on Reillex TM 425 (10.0) | 1% Cr(II) acetate on Reillex TM 425 (10.0) [recycle #29] | 1% Cr(II) acetate on Reillex TM 425 (10.0) [recycle #30] | 2% Cr(II) acetate on poly(4-vinyl pyridine n-oxide) (10.0) | 2% Cr(II)) acetate on poly(4-vinyl pyridine n-oxide) (10.0) [recycle #32] |
| reaction time (h) | 0.5 | 0.5 | 0.5 | 2.0 | 2.0 | 2.0 | 0.5 | 0.5 |
| temp (°C.) | 125 | 125 | 110-115 | 110-130 | 120-130 | 120-130 | 120-130 | 120-130 |
| pressure (psig) | 14.7 | 14.7 | 100 | 100 | 100 | 100 | 14.7 | 14.7 |
| flow (L/min) | 0.4 | 0.4 | 0.8 | 0.8 | 0.8 | 0.8 | 0.4 | 0.4 |
| GLC analysis | | | | | | | | |
| % conversion | 7.0 | 6.8 | 10.0 | 10.3 | 17.1 | 35.2 | 5.8 | 2.5 |
| % Tetralin ® | 93.0 | 93.2 | 90.0 | 89.7 | 82.9 | 64.8 | 94.2 | 97.5 |
| % α-tetralol | 0.40 | 0.47 | 0.37 | 0.46 | 1.56 | 9.37 | 0.18 | 0.02 |
| % α-tetralone | 5.06 | 4.8 | 8.32 | 8.50 | 13.80 | 21.22 | 3.98 | 0.73 |
| Ratio: α-tetralone / α-tetralol | 12.6 | 10.2 | 22.7 | 18.5 | 8.8 | 2.2 | 22.1 | 30.5 |

EXAMPLES 34-44

Oxidation of Tetralin ®

A series of oxidations were run in which the preferred 2% Cr(III) acetate/poly(4- vinylpyridine) [Reillex TM 425] catalyst of the present invention was recycled in batch processing. The reactions were run under 1 atmosphere $O_2$ as in Examples 18-27. The catalyst was not washed between runs. Selectivity remained high, averaging a α-tetralone/α-tetralol ratio of 24.7:1 through all ten (10) runs. An unexpected advantage was that no residue in the form of α-Tetralin ® hydroperoxide was formed.

Table II below sets forth the results obtained.

TABLE III

| | RECYCLE SERIES | | | | | | | | | |
|---|---|---|---|---|---|---|---|---|---|---|
| Example | 34 | 35 | 36 | 37 | 38 | 39 | 40 | 41 | 42 | 43 |
| Tetralin ® (g) | 291.9 | 291.9 | 291.9 | 291.9 | 291.9 | 291.9 | 291.9 | 291.9 | 291.9 | 291.9 |
| Catalyst (g) | 2% Cr(III) acetate Reillex TM 425 (70.0) | recycle | recycle | recycle | recycle | recycle | recycle | recycle | recycle | recycle |
| reaction time (h) | 0.5 | 0.5 | 0.5 | 0.5 | 0.5 | 0.5 | 0.5 | 0.5 | 0.5 | 0.5 |
| temp(°C.) | 120 | 120 | 120 | 120 | 120 | 120 | 120 | 120 | 120 | 120 |
| pressure (psig) | 14.7 | 14.7 | 14.7 | 14.7 | 14.7 | 14.7 | 14.7 | 14.7 | 14.7 | 14.7 |
| flow (L/min) | 0.4 | 0.4 | 0.4 | 0.4 | 0.4 | 0.4 | 0.4 | 0.4 | 0.4 | 0.4 |
| GLC analysis | | | | | | | | | | |
| % conversion | 5.52 | 5.61 | 5.57 | 5.44 | 4.47 | 4.47 | 4.77 | 4.97 | 4.77 | 5.72 |
| % Tetralin ® | 94.48 | 94.39 | 94.43 | 94.56 | 95.53 | 95.53 | 95.23 | 93.05 | 95.23 | 94.28 |
| % α-tetralol | 0.14 | 0.17 | 0.16 | 0.15 | 0.11 | 0.10 | 0.10 | 0.12 | 0.13 | 0.14 |
| % α-tetralone | 3.46 | 3.64 | 3.43 | 3.42 | 2.81 | 2.76 | 2.75 | 3.20 | 3.00 | 3.49 |
| % hydroperoxide | none | none | none | none | none | none | none | none | none | none |
| Ratio: α-tetralone / α-tetralol | 24.7 | 21.4 | 22.0 | 22.8 | 24.6 | 28.4 | 29.25 | 25.0 | 22.7 | 25.3 |

EXAMPLES 45–47

Continuous Oxidation of Tetralin ®

Continuous oxidation of Tetralin ® over the preferred 2% Cr(III) acetate/poly(4- vinylpyridine) [Reillex TM 425] catalyst was accomplished using the reaction set up and catalyst of Examples 1 and 2, with the addition of a peristaltic pump for the continuous charging of the reactor vessel with Tetralin ®. The reaction was run for 6 hours at a rate of 400 mL Tetralin ® processed per hour. Samples of the product stream at the beginning (Example 45), middle (Example 46), and end (Example 47) of the reaction showed conversions of 2.4, 2.3, and 2.6%, respectively, throughout the run. The α-tetralone/α-tetralol ratio remained at the acceptable level of 11.2 +/- 0.3 throughout the run.

EXAMPLE 48

Oxidation of Tetralin ®

A batch oxidation of Tetralin ® using the preferred 2% Cr(III) acetate/poly(4- vinylpyridine) [Reillex TM 425] catalyst was accomplished in a 1.0L Magne Drive autoclave reactor using pressurized air as the O2 source. Tetralin ® (396.6 grams, 3.0 moles) and 10 grams of 2% Cr(III) acetate/poly(4- vinylpyridine) [Reillex TM 425] catalyst prepared as in Example 1 were charged to the reactor which was stirred and heated to 120° C. Air at 400 psig (20 SCFH) was then sparged through the mixture for 45 minutes. After cooling, the catalyst was separated from the reaction mixture by filtration and the filtrate was analyzed by gas chromatography. Tetralin ® conversion was 8.4%, and the α-tetralone/α-tetralol ratio was 11.2.

EXAMPLE 49

Oxidation of Tetralin ®

A reaction similar to that reported in Example 48 was conducted using the most preferred 2% Cr(III) acetate/poly(2- vinylpyridine) [Reillex TM 225] catalyst. Analysis of the reaction mix showed Tetralin ® conversion of 19.8% with a α-tetralone/α-tetralol ratio of 9.8.

EXAMPLE 50

Continuous Oxidation of Tetralin ®

A 1.0L continuous stirred tank Magne Drive reactor equipped with a filter in the product take off line (to contact the catalyst within the reactor) was charged with 20 grams of the most preferred 2% Cr(III) acetate/poly(2- vinylpyridine) [Reillex TM 225] catalyst. The reaction volume was maintained at approximately 400mL. The temperature of the reaction mixture was controlled at 120° C. and the pressure was controlled at 400 psig. Tetralin ® feed (92.2% tetralin, 7.8% naphthalene) was continuously added to the reactor at 500mL/h (48 minute contact time). Air from a cylinder was continuously fed to the reactor at 200 SCFH. The reactor was operated continuously for a total of 50 hours. The liquid product was collected and fractions were analyzed by gas chromatography. Average Tetralin ® conversion was 15.5% with an average α-tetralone/α-tetralol ratio of 8.8, both more than acceptable under the circumstances of the reaction.

EXAMPLE 51

Preparation of a cross-linked poly-4- vinylpyridine containing 45% by weight 4- vinylpyridine The purpose of this Example was to show the simple preparation of one of many alternative polymers suitable for use in the Applicants' preferred catalyst and process embodiments using standard and known procedures. In particular, a monomer solution containing 45 g of 4- vinylpyridine, 31 g of commercial divinylbenzene (80% DVB), 24 g of styrene, 60 g of toluene, and 0.5 g of benzoyl peroxide was added to 30 ml of an aqueous solution containing 1% hydroxycellulose, 10% sodium chloride, and 0.04% sodium hydroxide. The two phase system was stirred at a moderate rate and heated to 70° C. for 8 hours. The heterogeneous mixture was cooled, filtered, and the cross-linked polymer washed with water and then methanol. The moist solid polymer was then dried for 6 hours at 100° C.

EXAMPLE 52

Oxidation of Tetralin ®

The polymer from Example 51 was used to prepare an oxidation catalyst containing 2%. Cr(III) acetate using the procedure set forth in Example 1. The catalyst was then used in a reaction similar to that incorporated in Example 48. Analysis of the reaction mix showed Tetralin ® conversion of 11.9% with a α-tetralone/α-tetralol ratio of 10.2.

EXAMPLE 53

Preparation of a cross-linked poly-2- vinylpyridine containing 10% by weight 2- vinylpyridine For a similar purpose, the procedure of Example 51 was repeated using 10g 2- vinylpyridine, 31g commercial divinylbenzene (80% DVB), 59g styrene, 60g toluene, and 0.5g benzoyl peroxide. The result was that a cross-linked poly-2- vinylpyridine containing 10% by weight 2- vinylpyridine was subsequently recovered.

EXAMPLE 54

Oxidation of Tetralin ®

The cross-linked polymer from Example 53 was used to prepare an oxidation catalyst containing 0.5% Cr(III) acetate using the procedure set forth in Example 1. Twenty grams of the catalyst was then used in a reaction similar to that described in Example 48. Analysis of the reaction mix showed Tetralin ® conversion of 15.5% with α-tetralone/α-tetralol ratio of 8.6.

EXAMPLES 55-56

Oxidation of Ethylbenzene to Acetophenone

Batch oxidations of ethylbenzene were carried out in a 1.0L Magne Drive reactor at 400 psig air pressure and in the presence of the 2% Cr(II) acetate/poly(4- vinylpyridine) [Reillex ™ 425] catalyst prepared as set forth in Example 1. Table IV sets forth the reaction conditions and the results obtained, which were more than acceptable based upon comparable prior art synthesis procedures for this reaction.

TABLE IV

| ETHYLBENZENE OXIDATION | | |
|---|---|---|
| Example | 52 | 53 |
| Ethylbenzene (g) | 311.6 | 371.6 |
| Catalyst | 2% Cr(II) acetate on Reillex ™ 425 | 2% Cr(II) acetate on Reillex ™ 425 |
| Weight catalyst (g) | 10.0 | 9.7 |
| Maximum reaction temperature (°C.) | 215 | 218 |
| Maximum air pressure (psig) | 400 | 400 |
| Maximum flow rate (SCFH) | 5.5 | 1.5 |
| Reaction time (hrs) | 5.5 | 1.5 |
| Wt. reaction mix (g) | 335.4 | 411.1 |
| GLC analysis: | | |
| % ethylbenzene | 74.79 | 64.18 |
| % α-phenethyl alcohol | none | none |
| % acetophenone | 22.96 | 32.50 |
| % benzoic acid | 0.69 | 1.52 |

EXAMPLE 57

Oxidation of 2-Methyl-5-Ethylpyridine to 2-Methyl-5-Acetylpyridine

A 1.0L Magne Drive reactor, equipped with an inlet tube for bubbling air and a pressurized condenser with liquid return line and vent system with traps and rotameter, was charged with 485.0 grams of 2-methyl-5-ethylpyridine of 98% or better purity, and 10 grams of the 2% Cr(II) acetate/poly(4- vinylpyridine) [Reillex ™ 425] catalyst prepared as set forth in Example 1. The reactor was pressurized to 400 psi with air and the vent opened enough to maintain a flow rate of about 3.5 SCFH. A Taylor $O_2$ analyzer was used on the vent gas to monitor relative changes in $O_2$%. During a 6 hour reaction time, the temperatures were gradually increased from 140° C. to 170° C. The reactor was cooled, depressurized, and the reaction mix was filtered and the filtrate analyzed by GLC. Water content was also checked and the analysis corrected accordingly, and very good results were obtained. The filtrate included 2-methyl-5-ethylpyridine (MEP), 2-methyl-5-acetylpyridine (MAP), 3-acetylpyridine, and 3-ethylpyridine. Gross yield (moles MAP in filtrate/moles MEP as starting material) was about 22.6%; net yield (moles MAP in filtrate/moles MEP as starting material - moles MEP found in filtrate) was about 68.2%; conversion (moles MEP in starting material - moles MEP in found in filtrate/moles MEP in starting material) was about 39.2%; and the ratio of MAP/3-acetylpyridine was about 32.1.

What is claimed is:

1. A process for the oxidation of Tetralin ® to α-tetralone, comprising the steps of
   combining 1,2,3,4-tetrahydronaphthalene within a reaction vessel with an insoluble oxidation catalyst having a chromium salt bound on an insoluble polymer support having pendant pyridine groups and with an oxygen-containing gas; and
   heating the resultant mixture to a temperature sufficient to bring about the oxidation of 1,2,3,4-tetrahydronaphthalene.

2. The process of claim 1 and further comprising the step of recovering the catalyst by filtration means after said oxidation.

3. The process of claim 1 and further comprising the step of recovering α-tetralone from the reaction mixture after said oxidation.

4. A process for the oxidation of ethylbenzene to acetophenone, comprising the step of
   combining ethylbenzene within a reaction vessel with an insoluble oxidation catalyst having a chromium salt bound on an insoluble polymer support having pendant pyridine groups and with an oxygen-containing gas; and
   heating the resultant mixture to a temperature sufficient to bring about the oxidation of ethylbenzene.

5. The process of claim 4 and further comprising the step of recovering the catalyst by filtration means after said oxidation.

6. The process of claim 4 and further comprising the step of recovering acetophenone from the reaction mixture after said oxidation.

* * * * *